United States Patent
Kim et al.

(10) Patent No.: US 9,866,488 B2
(45) Date of Patent: Jan. 9, 2018

(54) METHOD AND APPARATUS FOR PRESERVING END TO END SEMANTIC AND PERFORMANCE ENHANCEMENT OF SPLIT-TCP PROTOCOLS

(71) Applicant: Alcatel-Lucent USA Inc., Murray Hill, NJ (US)

(72) Inventors: Bongho Kim, Morganiville, NJ (US); Doru Calin, Manalapan, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 231 days.

(21) Appl. No.: 14/943,128

(22) Filed: Nov. 17, 2015

(65) Prior Publication Data

US 2017/0142015 A1 May 18, 2017

(51) Int. Cl.
*H04L 12/801* (2013.01)
*H04L 29/06* (2006.01)
*H04L 12/721* (2013.01)
*H04L 12/807* (2013.01)

(52) U.S. Cl.
CPC .............. *H04L 47/18* (2013.01); *H04L 45/14* (2013.01); *H04L 47/27* (2013.01); *H04L 69/02* (2013.01); *H04L 69/16* (2013.01)

(58) Field of Classification Search
None
See application file for complete search history.

(56) References Cited

PUBLICATIONS

Raj Yavatkar et al. "Improving End-to-End Performance of TCP over Mobile Internetworks". IEEE. 1995. pp. 146-152.
Rajiv Chakravorty et al. Flow Aggregation for Enhanced TCP over Wide-Area Wireless. IEEE Infocom. 2003.
Ajay Bakre et al. "I-TCP: Indirect TCP for Mobile Hosts". Rutgers University—Dept of Computer Science. Oct. 1994. pp. 1-18.
A. Ford et al. "TCP Extensions for Multipath Operation with Multiple Addresses". Internet Engineering Task Force (IETF). Jan. 2013. pp. 1-64.
Muhammad Faisal Amjad et al. "Transparent Cross=Layer Solutions for Throughput Boost in Cognitive Radio Networks". The 10th Annual IEEE CCNC—Wireless Networking Track. 2013. pp. 580-586.
Fei Xie et al. "Semi-Split TCP: Maintaining End-to-End Semantics for Split TCP". IEEE Conference—Computer Society. 2007. pp. 303-311.
Kevin Brown et al. "M-TCP: TCP for Mobile Cellular Networks". University of South Carolina—Dept of Computer Science. Jul. 29, 1997.

*Primary Examiner* — Christine Duong
(74) *Attorney, Agent, or Firm* — Harness, Dickey & Pierce, P.L.C.

(57) ABSTRACT

In one example embodiment, a network node includes a processor configured to receive one or more data packets from a transmitter and transmit at least one first-type confirmation message to the transmitter based on a threshold, the at least one first-type confirmation message including an acknowledgement that all but at least two bytes of data included in the one or more data packets are received from the transmitter. The processor is further configured to transmit at least one second-type confirmation message to the transmitter based on at least one of a size of a buffer at the network node available for receiving data packets and an acknowledgement from an end device acknowledging receipt of the one or more data packets, the at least one second message including an acknowledgement of one or more of the at least two bytes of data.

20 Claims, 6 Drawing Sheets

METHOD AND APPARATUS FOR PRESERVING END TO END SEMANTIC AND PERFORMANCE ENHANCEMENT OF SPLIT-TCP PROTOCOLS

BACKGROUND

In wireless communications, many non-realtime data communications utilize the Transport Control Protocol (TCP). TCP typically under utilizes a network's (e.g., a wireless network's) capacity and therefore, network operators have significant interest in optimizing TCP performance over a wireless network. As fourth generation long-term evolution (4G-LTE) wireless networks with high rate of data exchange are widely deployed, and LTE-Advanced and the fifth generation (5G) networks with even higher rate data exchanges are being developed, improving TCP performance over such networks would have a broad and even more significant impact on data application performance.

The Internet protocol (TCP/IP) is currently coping with some of its fundamental limitations by deploying architectural fixes such as mobility, localizing erroneous network environment and caching, which may not be sufficiently flexible or manageable for the next generation communication standards such as the 5G network mentioned above. Another solution has been a Multipath TCP (MPTCP) that establishes multiple TCP connections with multiple addresses instead of establishing a single TCP connection between a content provider (a server, for example) and a receiver (an end user device, for example). This requires the TCP protocol stack to be modified but still runs over the traditional TCP protocol as each of the TCP sub flows is operated by the traditional TCP protocol. Thus, the TCP performance improvement with the single TCP connection remains critical for the end-to-end application performance enhancement.

To provide a reliable data transfer, TCP is often used for end-to-end error control at the transport layer. However, TCP is known to have poor performance over unreliable wireless links, where packet losses due to transmission errors are misinterpreted as indications of network congestion. One of the main concerns is the poor TCP performance over wireless network while wireless data rate is rapidly increasing. Given that TCP requires a receiver acknowledgement for every data byte sent, the network throughput (when using the standard TCP) is inversely related to network latency or round trip time (RTT). Thus, the distance between server and end user becomes a true bottleneck factor in download speeds and hard to circumvent, unless the server is relatively close to the end user. One of the mechanisms that could address the bottleneck factor and thus improve the TCP performance is known as "Split-TCP."

The Split-TCP mechanism divides an end-to-end TCP connection into multiple TCP connections (i.e. a wired connection segment and a wireless connection segment). The split connection mechanism attempts to separate loss recovery over the wireless connection from that across the wired connection since the wired and wireless domains have distinct characteristics. In this way, the original TCP transmitter is shielded from network problems over the wireless connection (e.g., the bottleneck problem described above), and may improve greatly the end-to-end performance.

However, one major drawback of the Split-TCP is that acknowledgments received by the sender do not necessarily translate into the packets having been successfully received by the actual intended destination (e.g., the end user device). In the event that the intended destination (which may be a mobile device) loses a connection while moving to another cell or the Split-TCP proxy (e.g., a base station) crashes, the actual transmission of data to the destination may fail while it appears to the sender that the transmission has been completed. This violates the end-to-end semantic of the TCP protocol. Since the end-to-end semantic is violated, the transmission of data is no longer reliable and is damaging to the layering structure of the internet protocols. It is clear that the Split-TCP mechanism has a strong potential to be broadly deployed if this critical drawback, the lack of end-to-end semantic problem, is resolved.

SUMMARY

In one example embodiment, a network node includes a processor configured to receive one or more data packets from a transmitter and transmit at least one first-type confirmation message to the transmitter based on a threshold, the at least one first-type confirmation message including an acknowledgement that all but at least two bytes of data included in the one or more data packets are received from the transmitter. The processor is further configured to transmit at least one second-type confirmation message to the transmitter based on at least one of a size of a buffer at the network node available for receiving data packets and an acknowledgement from an end device acknowledging receipt of the one or more data packets, the at least one second message including an acknowledgement of one or more of the at least two bytes of data.

In yet another example embodiment, the processor is configured to transmit the at least one first-type confirmation message if a total size of a most recent one of the one or more data packets and the at least two unacknowledged bytes of data, is greater than the threshold, and upon transmitting the at least one first-type confirmation message, update the at least two unacknowledged bytes of data to be the last two bytes of the most recent one of the one or more data packets.

In yet another example embodiment, the processor is configured to determine a window size, the window size indicating the size of the buffer at the network node that is available for receiving the one or more data packets from the transmitter, the window size being transmitted as part of the at least one first-type confirmation message or the at least one second-type confirmation message to the transmitter.

In yet another example embodiment, upon determining that the window size is zero, the processor is configured to transmit the window size of zero as part of the at least one first-type confirmation message to the transmitter, the transmission of the window size of zero freezing a transmission of further data packets by the transmitter to the network node.

In yet another example embodiment, upon determining that the window size has changed from zero to a non-zero value, the processor is configured to transmit the at least one second-type confirmation message to the transmitter, the at least one second-type confirmation message including the non-zero window size and an acknowledgement of one of the at least two unacknowledged bytes of data, the non-zero value window size and the acknowledgement of the one of the at least two unacknowledged bytes of data included in the at least one second-type confirmation message resulting in unfreezing of the transmission of further data packets by the transmitter.

In yet another example embodiment, the processor is configured to transmit the received one or more data packets to the end device, receive the acknowledgement from the end device acknowledging the receipt of the one or more data packets by the end device, and upon receiving the acknowledgement from the end device, transmit the at least one second-type confirmation message to the transmitter indicating that the at least two unacknowledged bytes of data have been received.

In yet another example embodiment, upon determining that the window size is greater than zero, the processor is configured to transmit the at least one first-type confirmation message to the transmitter and determine whether an estimated retransmission time out (RTO) timer has expired, the RTO timer being a timer at the transmitter, which when expired, cause the transmitter to retransmit the at least two unacknowledged bytes of data to the network node. The processor is further configured to transmit the at least one second-type confirmation message to the transmitter if the processor determines that the estimated RTO timer has expired, the at least one second-type confirmation message including a window size of zero and an acknowledgement of one of the at least two unacknowledged bytes of data, the zero window size and the acknowledgement of the one of the at least two unacknowledged bytes of data included in the at least one second-type confirmation message resulting in a freezing of one or more retransmissions of the at least two unacknowledged bytes of data to the network node by the transmitter.

In yet another example embodiment, upon determining that the estimated RTO timer has not expired, the processor is configured to determine whether a retransmission of at least one of the at least two unacknowledged bytes of data has been received at the network node from the transmitter and transmit the at least one second-type confirmation message upon determining that the network node has received the retransmission of at least one of the at least two unacknowledged bytes of data.

In yet another example embodiment, the processor is configured to transmit the received one or more data packets to the end device, and transmit the at least one second-type confirmation message to the transmitter indicating that the at least two unacknowledged bytes of data have been received, if the processor receives the acknowledgement from the end device acknowledging the receipt of the one or more data packets by the end device.

In yet another example embodiment, the processor is configured to estimate the RTO timer to be less than an actual RTO timer at the transmitter.

In yet another example embodiment, a network in which the network node, the transmitter and the end device operate is one of a 4G-LTE network or a 5G network, the network node is a packet gateway, the transmitter is a content server, the end device is a mobile device operating within the network, and a communication between the transmitter, the network node and the end device is a transport control protocol (TCP) based communication.

In one example embodiment, a method includes receiving one or more data packets from a transmitter, first transmitting at least one first-type confirmation message to the transmitter based on a threshold, the at least one first-type confirmation message including an acknowledgement that all but at least two bytes of data included in the one or more data packets are received from the transmitter, and second transmitting at least one second-type confirmation message to the transmitter based on at least one of a size of a buffer at the network node available for receiving data packets and an acknowledgement from an end device acknowledging receipt of the one or more data packets, the at least one second message including an acknowledgement of one or more of the at least two bytes of data.

In yet another example embodiment, the first transmitting transmits the at least one first-type confirmation message if a total size of a most recent one of the one or more data packets and the at least two unacknowledged bytes of data, is greater than the threshold, and upon transmitting the at least one first-type confirmation message, updating the at least two unacknowledged bytes of data to be the last two bytes of the most recent one of the one or more data packets.

In yet another example embodiment, the method further includes determining a window size, the window size indicating the size of the buffer at the network node that is available for receiving the one or more data packets from the transmitter, the window size being transmitted as part of the at least one first-type confirmation message or the at least one second-type confirmation message to the transmitter.

In yet another example embodiment, upon determining that the window size is zero, the first transmitting transmits the window size of zero as part of the at least one first-type confirmation message to the transmitter, the transmission of the window size of zero freezing a transmission of further data packets by the transmitter to the network node.

In yet another example embodiment, upon determining that the window size has changed from zero to a non-zero value, the second transmitting transmits the at least one second-type confirmation message to the transmitter, the at least one second-type confirmation message including the non-zero window size and an acknowledgement of one of the at least two unacknowledged bytes of data, the non-zero value window size and the acknowledgement of the one of the at least two unacknowledged bytes of data included in the at least one second-type confirmation message resulting in unfreezing of the transmission of further data packets by the transmitter.

In yet another example embodiment, the method further includes third transmitting the received one or more data packets to the end device, and receiving the acknowledgement from the end device acknowledging the receipt of the one or more data packets by the end device, wherein upon receiving the acknowledgement from the end device, the second transmitting transmits the at least one second-type confirmation message to the transmitter indicating that the at least two unacknowledged bytes of data have been received.

In yet another example embodiment, the first transmitting transmits the at least one first-type confirmation message to the transmitter upon determining that the window size is greater than zero, the method further comprises determining whether an estimated retransmission time out (RTO) timer has expired, the RTO timer being a timer at the transmitter, which when expired, cause the transmitter to retransmit the at least two unacknowledged bytes of data to the network node, and the second transmitting transmits the at least one second-type confirmation message to the transmitter if the determining determines that the estimated RTO timer has expired, the at least one second-type confirmation message including a window size of zero and an acknowledgement of one of the at least two unacknowledged bytes of data, the zero window size and the acknowledgement of the one of the at least two unacknowledged bytes of data included in the at least one second-type confirmation message resulting in freezing of one or more retransmissions of the at least two unacknowledged bytes of data to the network node by the transmitter.

In yet another example embodiment, the method further includes determining whether a retransmission of at least one of the at least two unacknowledged bytes of data has been received at the network node from the transmitter, upon determining that the estimated RTO timer has not expired, wherein the second transmitting transmits the at least one second-type confirmation message upon determining that the network node has received the retransmission of at least one of the at least two unacknowledged bytes of data.

In yet another example embodiment, the method further includes third transmitting the received one or more data packets to the end device, and receiving the acknowledgement from the end device acknowledging the receipt of the one or more data packets by the end device, wherein the second transmitting transmits the at least one second-type confirmation message to the transmitter indicating that the at least two unacknowledged bytes of data have been received, if the receiving receives the acknowledgement.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION OF EXAMPLE EMBODIMENTS

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

While example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at, for example, existing small wireless cells, base stations, NodeBs, user equipments (UEs) including low cost machine type communication (LC-MTC) UEs, etc. Such existing hardware may include one or more Central Processing Units (CPUs), system-on-chip (SOC) devices, digital signal processors (DSPs), application-specific-integrated-circuits, field programmable gate arrays (FPGAs) computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium", "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

As used herein, the term "eNodeB" or "eNB" may be considered synonymous to, and may hereafter be occasionally referred to as a NodeB, base station, transceiver station, base transceiver station (BTS), macro cell, etc., and describes a device in communication with and providing wireless resources to UEs in a geographical coverage area. As discussed herein, eNBs may have all functionally associated with conventional, well-known base stations in addition to the capability and functionality discussed herein.

As used herein, the term "small wireless cell" may be considered synonymous to, and may hereafter be occasionally referred to as a micro cell, pico cell, Home NodeB (HNB), Home eNodeB (HeNB), etc., and describes a device in communication with and providing wireless resources (e.g., LTE, 3G, WiFi, etc.) to users in a geographical coverage area that is, in most cases, smaller than the geographical coverage area covered by a macro eNB or cell. As discussed herein, small wireless cells may have all functionally associated with conventional, well-known base stations in addition to the capability and functionality discussed herein. In this regard, the small wireless cells may include a base station or eNB. Small wireless cells according to at least some example embodiments may also serve as WLAN (or WiFi) access points (APs) providing WLAN (or WiFi) resources for devices within range of the small wireless cell. Although discussed with regard to macro eNBs, example embodiments may also be applicable to small wireless cells and base stations.

Generally, as discussed herein, a small wireless cell may be any well-known small wireless cell including one or more processors, various communication interfaces (e.g., LTE, WiFi and wired), a computer readable medium, memories, etc. The one or more interfaces may be configured to transmit/receive data signals via wireless connections over a WiFi and a cellular network to/from one or more other devices, and also communicate with the Internet, for example over a wired connection.

The term "user equipment" or "UE", as discussed herein, may be considered synonymous to, and may hereafter be occasionally referred to, as user, client, client device, mobile unit, mobile station, mobile user, mobile, subscriber, user, remote station, access terminal, receiver, etc., and describes a remote user of wireless resources in a wireless communication network (e.g., a $3^{rd}$ Generation Partnership Project Long-Term Evolution (3GPP LTE) network, 4G, 4G-LTE, 5G, etc.).

According to example embodiments, UEs, small wireless base stations (or cells), eNBs, etc. may be (or include) hardware, firmware, hardware executing software, or any combination thereof. Such hardware may include one or more Central Processing Units (CPUs), system-on-chip (SOC) devices, digital signal processors (DSPs), application-specific-integrated-circuits (ASICs), field programmable gate arrays (FPGAs), computers, or the like, configured as special purpose machines to perform the functions described herein as well as any other well-known functions of these elements. In at least some cases, CPUs, SOCs, DSPs, ASICs and FPGAs may collectively be referred to as processing circuits, processors and/or microprocessors.

Example embodiments may be utilized in conjunction with RANs such as: Universal Mobile Telecommunications System (UMTS); Global System for Mobile communications (GSM); Advance Mobile Phone Service (AMPS) system; the Narrowband AMPS system (NAMPS); the Total Access Communications System (TACS); the Personal Digital Cellular (PDC) system; the United States Digital Cellular (USDC) system; the code division multiple access (CDMA) system described in EIA/TIA IS-95; a High Rate Packet Data (HRPD) system, Worldwide Interoperability for Microwave Access (WiMAX); Ultra Mobile Broadband (UMB); and $3^{rd}$ Generation Partnership Project LTE (3GPP LTE).

Example embodiments described hereinafter, illustrate an enhancement to the Split-TCP mechanism (hereinafter referred to as enhanced Split-TCP or ES-TCP) such that the end-to-end semantic (server-to-end user semantic) is preserved while network throughput gain is increased compared to various existing variations of the TCP used in communication networks.

Figure 1:
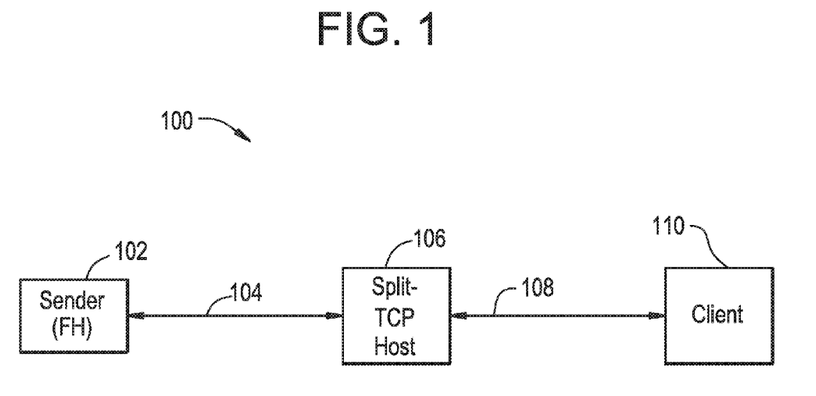
FIG. 1 illustrates a network structure utilizing an enhanced Split-TCP mechanism, according to an example embodiment.

FIG. 1 illustrates a network structure utilizing an enhanced Split-TCP mechanism, according to an example embodiment.

In one example embodiment and as shown in FIG. 1, the network structure 100 includes a sender (which may also be referred to as a transmitter, and/or a far host (FH)) 102 connected, via a connection 104, to a Split-TCP host (which may also be referred to as a network node and/or an enhanced host (EH)) 106. The Split-TCP host 106 is in turn connected, via a connection 108, to a client (which may also be referred to as an end device, an end user device and/or a mobile host (MH)) 110.

The FH 102 may be any known or to be developed server having content, such as different types of media content to be communicated to the client 110 using the enhanced Split-TCP mechanism, which will be described in more detail below.

In one example embodiment, the connection 104 may be a wired connection such as any known or to be developed wired and/or wireless networks. The connection 104 may be any type of Wide Area network (WAN) and may be referred to as the TCP-WAN connection 104.

The connection 108, in one example embodiment, is any known or to be developed wireless connection (i.e., radio access technology (RAN)) capable of implementing a TCP based communication between two network nodes. The connection 108 may be referred to as the TCP-RAN connection 108. The TCP-RAN connection 108 may include network components, as is known in the art that enable data communication based on the underlying RAN connection. Examples of such network components include, but are not limited to, a base station (macro-cell and/or small cell base station), a network gateway, a packet-gateway (PGW), a mobility management entity (MME), etc. In one example embodiment, the connection 108 may be a wired connection instead of a wireless connection.

In one example embodiment, the EH 106 may be implemented at any one of the network components of the TCP-RAN connection 104 (e.g., at a PGW of the TCP-RAN connection 104, for example).

The client 110 may be any known or to be developed end device capable of establishing a TCP connection with a host and receiving content from the host via the TCP connection. The client 110 may be any one of, but not limited to, a mobile device, a cellular phone, a laptop, a personal computer, a tablet, etc.

The content stored on the FH 102 may be transmitted as part of one or more data packets to the MH 110 via the EH 106. The TCP-WAN connection 104 and the TCP-RAN connection 108 may operate independently from one another such that any connectivity issues in either of the TCP-WAN connection 104 and/or the TCP-RAN connection 108 is isolated to its respective connection without affecting a performance of the other one of the TCP-WAN connection 104 or the TCP-RAN connection 108.

Furthermore in FIG. 1, a single MH 110 is shown. However, example embodiments are not limited thereto. There may be two or more MHs 110 that receive data packets from the FH 102. In one example embodiment, all transmissions and reception of data packets between the FH 102 and the one or more MHs 110 goes through a single EH such as the EH 106.

Figure 2:
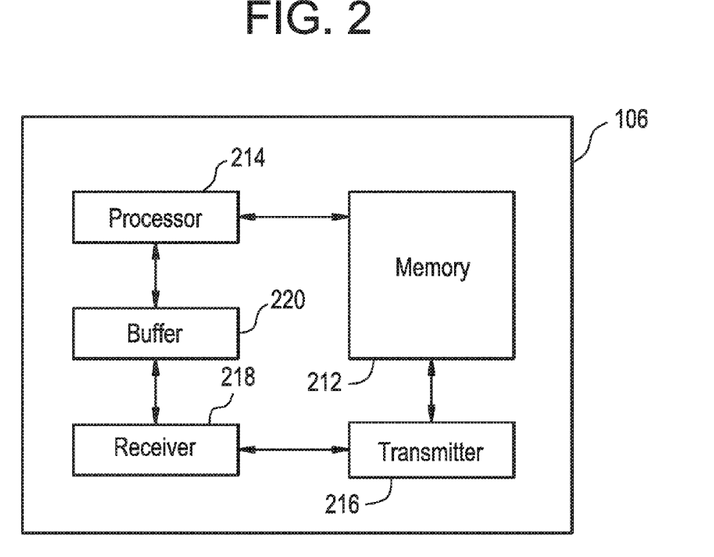
FIG. 2 illustrates a structure of an enhanced Split-TCP host of FIG. 1, according to an example embodiment.

FIG. 2 illustrates a structure of an enhanced Split-TCP host of FIG. 1, according to an example embodiment.

In an example embodiment shown in FIG. 2, the EH 106 includes a memory 212 and a processor 214. The memory 212 stores, among other information, computer-readable instructions for implementing the enhanced Split-TCP functionalities, which will be further described below. The processor 214 executes the computer-readable instructions stored in the memory 212, thus turning the processor 214 into a special-purpose processor for implementing the enhanced Split-TCP functionalities.

The EH 106 further includes a transmitter 216, a receiver 218 and a buffer 220. In one example embodiment, the EH 106, via the transmitter 216, transmits data packets received from the FH 102 to the MH 110 and the EH 106 receives acknowledgements regarding the transmitted data packets from the MH 110.

In one example embodiment, the EH 106, via the receiver 218, receives data packets from the FH 102 to be forwarded to the MH 110 via the transmitter 216. In one example embodiment, the receiver 218 sends acknowledgements to the FH 102 acknowledging receipt of data packets from the FH 102 and/or informing the FH 102 that the MH 110 has received the transmitted data packets.

In one example embodiment, upon receiving data packets from the FH 102, the EH 106 temporarily stores the received data packets in the buffer 220. While in FIG. 2 the buffer 220 is shown as a separate component from the memory 212, in one example embodiment, the buffer 220 may be a portion of the memory 212 and not a separate component therefrom. The buffer 220 may be any known, or to be developed, buffer that may be utilized for temporary storing of data packets at a node such as the EH 106.

The enhanced Split-TCP (ES-TCP) will now be described with reference to FIG. 3. In one example embodiment, the ES-TCP is implemented at the EH 106, without modifying the TCP configurations at the FH 102 and/or the MH 110. Furthermore, for purposes of illustration, a download operation by the MH 110 of the data packets transmitted by the FH 102 will be described. However, example embodiments are not limited thereto and may be extended to other operations such as an upload operation from the MH 110 to the FH 102.

Figure 3:
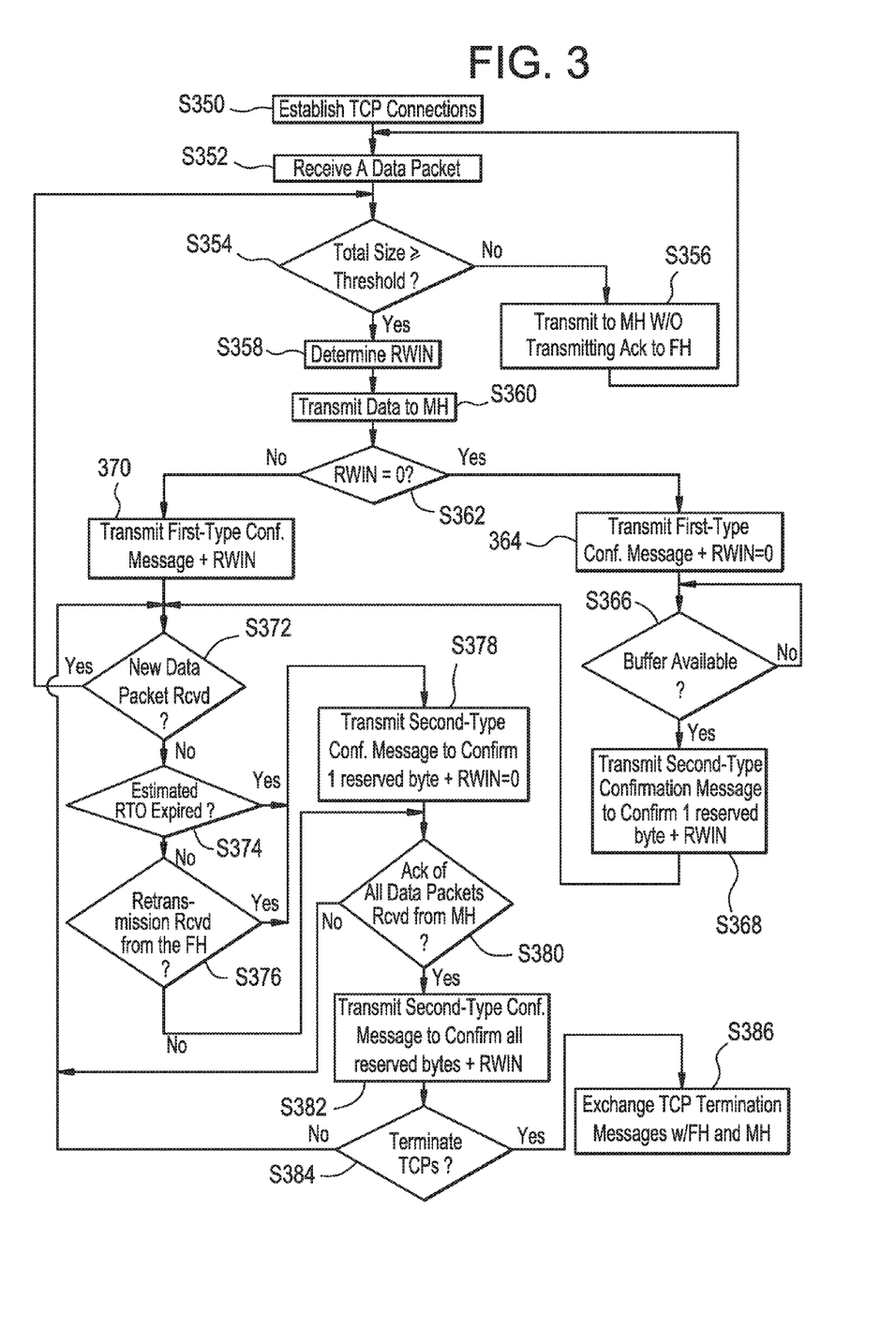
FIG. 3 describes a process of handling data transmission based on ES-TCP at the Split-TCP host of FIG. 1, according to an example embodiment.

Prior to describing the details of the ES-TCP with reference to FIG. 3, an overview of the ES-TCP at the EH 106 is provided.

At any point in time, the ES-TCP reserves the most recent two bytes of data from the data packets received so far from the FH 102 at the EH 106 and does not acknowledge the safe receipt of the most recent two bytes of data to the FH 102. The most recent two bytes of data may be referred to as the two reserved and/or unacknowledged bytes of data throughout the present disclosure.

In one example embodiment, the EH 106 utilizes 1 byte of the two unacknowledged bytes of data for freezing and/or unfreezing the transmission of data packets by the FH 102, as will be described below. Furthermore, the EH 106 reserves the last remaining byte of the two unacknowledged bytes until the EH 106 receives an acknowledgement from the MH 110 confirming the safe receipt of all data packets by the MH 110. Once the acknowledgement is received from the MH 110, the EH 106 then acknowledges the all unacknowledged bytes to the FH 102, thus ensuring that the end-to-end semantic between the FH 102 and the MH 110 is preserved.

It should be noted that while reference is made to only two unacknowledged bytes of data, example embodiments are not limited thereto. Example embodiments also encompass scenarios in which the EH 106 reserves more than two unacknowledged bytes of data.

FIG. 3 describes a process of handling data transmission based on ES-TCP at the Split-TCP host of FIG. 1, according to an example embodiment. While the EH 106 is referenced below as performing the steps of FIG. 3, it is understood that the processor 214 of the EH 106, as described above, is configured to implement the computer-readable instructions stored in the memory 212 of the EH 106 to carry out the steps of FIG. 3, described below.

At S350, the EH 106 establishes a first TCP connection with the FH 102 via the TCP-WAN communication 104, according to known methods (e.g., through the known TCP-SYN process). The EH 106 also established a second TCP connection with the MH 110 via the TCP-RAN connection 108, according to known methods (e.g., through the known TCP-SYN process). As is known in the art, upon establishing the first TCP connection with the FH 102, the EH 106 starts a timer. In one example embodiment, the timer is an estimate of a TCP retransmission time out (RTO) timer at the FH 102. In one example embodiment, a new RTO timer at the FH 102 also starts every time the FH 102 transmits a new packet to the EH 106 and is stopped when a corresponding packet is acknowledged by the EH 106. The RTO timer, as is known in the art, is used by the FH 102 to determine when to retransmit certain bytes of data transmitted to the EH 106 but not yet acknowledged by the EH 106. In one example embodiment and as will be further described below, the estimation of the TRO timer of the FH 102 at the EH 106 prevents the timer at the FH 102 from being timed out when the reserved and unacknowledged data byte is not acknowledged by the EH 106 for a prolong time caused by the delayed acknowledgement from MH 110.

In one example embodiment, similar RTO timer(s) and estimate(s) thereof are established between the EH 106 and the MH 110 for the TCP-RAN connection 108.

In one example embodiment, the EH 106 estimates the RTO timer of the FH 102 using the same formula, as is known in the art, as used by the EH 106 to set up the RTO timer at FH 102. In one example embodiment and in order to avoid unnecessary retransmission of the unacknowledged bytes, the EH 106 may estimate the RTO timer to be less than the actual RTO timer at the FH 102.

Upon establishing the first and second TCP connections, at S352, the EH 106 receives a data packet from the FH 102.

At S354, the EH 106 determines whether a total size of new bytes of data included in the newly received data packet plus the reserved data bytes (e.g., the two reserved and unacknowledged bytes of data described above) is greater than or equal to a threshold. In one example embodiment, the threshold is set to be equal to 3, where the number "3" is based on the fact that one byte of data is for acknowledging how many bytes are received at the EH 105 and two additional bytes correspond to the two reserved and unacknowledged bytes of data that are received by the EH 106 but at least one of which is not acknowledged until a confirmation from the MH 110 is received at the EH 106 that all data packets have been received by the MH 110. However, example embodiments are not limited thereto and the threshold may be determined, based on empirical studies, to be any number greater than 1.

If at S354, the EH 106 determines that the total size is less than the threshold, then at S356, the EH 106 stores the received data packet in the buffer 220, followed by the transmission of the received data packet to the MH 110 without transmitting a confirmation message (a confirmation message may also be referred to as an acknowledgement (ACK), as known in the art) to the FH 102 confirming the safe receipt of the data packet (i.e., acknowledging the receipt of the data packet). Thereafter, the process reverts back to S352 where S352 and S354 are then repeated.

However, if at S354, the EH 106 determines that the total size is equal to or greater than the threshold, then at S358 determines a receive window size (RWIN), which indicates the amount of free space available on the buffer 220 of the EH 106 for receiving further data packets from the FH 102. For example, if the buffer 220 has a size of 2000 bytes and the data packet received at S352 has a size of 1000 bytes, then RWIN has a value equal to 1000, which means that the buffer 220 has enough capacity to receive up to 1000 more bytes of data.

At S360, the EH 106 transmits the received data packet to the MH 110. The EH 106 may then receive a confirmation message from the MH 110 confirming the safe receipt of the data packet by the MH 110. While in FIG. 3, S360 is shown to be performed by the EH 106 after S358, example embodiments are not limited thereto. The EH 106 may receive the confirmation message from the MH 110 at any time before or after receiving any further data packets form the FH 102 and/or any time before or after transmitting the first-type confirmation message (or a second-type confirmation message, which will be described further below) to the FH 102. In other words, the transmission of data packets from the EH 106 to the MH 110 may run independent of and in parallel to the exchange of data packets and confirmation messages between the EH 106 and the FH 102.

At S362, the EH 106 determines whether the RWIN determined at S358 is equal to zero.

If at S362, the EH 106 determines that the RWIN is equal to zero, then at S364, the EH 106 transmits a first-type confirmation message to the FH 102, acknowledging the safe receipt of all but the reserved (at least the last two) bytes of the received data packet as well as the RWIN having a value equal to zero.

For example, if the data packet received at S352 has a size of 1000 bytes, then at S360, the EH 106 transmits a first-type confirmation message acknowledging the receipt of the first 998 bytes but not the last two bytes of data. The first-type confirmation message may refer to a confirmation message that includes a confirmation of all but the reserved bytes of data received at the EH 106.

In one example embodiment, the RWIN having a value of zero, freezes the FH 102 and prevents the FH 102 from transmitting any more data packets to the EH 106, because the buffer 220 at the EH 106 has no more space to accept any further bytes of data.

In one example embodiment and for data packets received after the first data packet in a given TCP session, the EH 106 ensures that the last two bytes of data of the most recent data packet is reserved and unacknowledged by sending a sequence number that is two bytes less than that expected by the FH 102. For example, if a total of 2000 bytes of data are transmitted from the FH 102 to the EH 106 as part of two data packets each having a length of 1000 bytes, the EH 106 sends a sequence number 1998, which is 2 bytes less than the sequence number 2000 expected by the FH 102 to be acknowledged. Accordingly, at S364 and during the transmission of the first-type confirmation message, the EH 106 updates the reserved/unacknowledged two bytes of data to be the last two bytes of the most recent data packet received at the EH 106 from the FH 102.

Thereafter, at S366, the EH 106 checks the size of the buffer 220 and determines whether the buffer 220 is available to receive more bytes of data. If at S366, the EH 106 determines that the buffer 220 is not available to receive more bytes of data, then the EH 106 periodically repeats S366 until the buffer 220 becomes available to receive more bytes of data. When the EH 106 determines at S366 that the buffer 220 is available to receive more bytes of data, then at S368, the EH 106 transmits a second-type confirmation message to the FH 102 together with RWIN (RWIN after S366 is equal to the available size of the buffer).

The second-type confirmation message may refer to a confirmation message that also includes a confirmation of at least one of the reserved two bytes of data that are unacknowledged by the EH 106. In one example embodiment, the acknowledging of one of the two reserved and unacknowledged bytes of data unfreezes the FH 102 (which was frozen at S364 described above).

In one example embodiment, the unfreezing also is done via an RWIN update messaging without acknowledging a new data byte. The unfreezing of the FH 102 by the EH 106, allows the FH 102 to transmit any further data packets that the FH 102 may still have for transmission. Thereafter, the process proceeds to S372, which will be described below.

Referring back to S362, if at S362, the EH 106 determines that the RWIN is not equal to zero, then at S370, the EH 106 transmits the first-type confirmation message to the FH 102, which is the same as the first-type confirmation message transmitted at S364 except that the RWIN included in the first-type confirmation message at S370 has a value equal to the RWIN determined at S358 (e.g., a non-zero value of for example 1000).

At S372, the EH 106 determines whether any new data packets have been received from the FH 102. If the EH 106 determines that a new data packet has been received from the FH 102, the process reverts back to S354 and S354 to S370 repeat.

However, if the EH 106 determines that no new data packets have been received from the FH 102 and the reserved and unacknowledged data byte at the EH 106 has not been acknowledged (due to the delayed acknowledgement thereof from the MH 110), then at S374, the EH 106 determines if a corresponding estimated RTO timer (which as described above started at the time of establishing the TCP connections at S350) has expired or not.

It should be noted that in one example embodiment, the RTO timer (e.g., at the receiver side of the EH 106) is reset every time a new data packet is received at the EH 106 from the FH 102 and as a result, a confirmation message acknowledging a receipt thereof is sent to the FH 102 (in other word, every time the reserved and unacknowledged data bytes are replaced with new bytes, the RTO timer is reset).

If at S374, the EH 106 determines that the estimated RTO timer has expired then the process proceeds to S378, which will be described below.

However, if at S374, the EH 106 determines that the estimated RTO timer has not expired then, at S376, the EH 106 determines whether a retransmission of one or more of the reserved and unacknowledged bytes of data has been received from the FH 102 (e.g., due to the expiration of the actual RTO timer at the FH 102 earlier than the expiration of the estimated RTO timer at the EH 106).

If at S376, the EH 106 determines that a retransmission of one or more of the reserved and unacknowledged bytes of data has not been received from the FH 102, the process proceeds to S380, which will be described below.

However, if at S376, the EH 106 determines that a retransmission of one or more of the reserved and unacknowledged bytes of data has been received from the FH 102, then at S378, the EH 106 transmits a second-type confirmation message. The second-type confirmation message at S378 is similar to the second-type confirmation message described above with reference to S368 in that it also includes an acknowledgement of at least one of the two reserved and unacknowledged bytes of data. Furthermore, the second-type confirmation message at S378 will include a RWIN of zero in order to freeze and prevent any further retransmission of the unacknowledged bytes of data by the FH 102.

In one example embodiment, implementing S374, S376 and S378 ensures that either no retransmission of the reserved and unacknowledged bytes of data are received from the FH 102 or in the alternative, as soon as one retransmission is received from the FH 102, any further retransmission of data bytes is prevented.

After transmission of the second-type confirmation message at S378, at S380, the EH 106 determines whether an acknowledgement/confirmation message has been received from the MH 110, which confirms that the MH 110 has received all of the data packets transmitted to the MH 110 by the EH 106.

If at S380, the EH 106 determines that no acknowledgement/confirmation message from the MH 110 has been received indicating that not all of the data packets transmitted to the MH 110 by the EH 106 have been received, then the process reverts back to S372 where either S352 to S380 is repeated or S372-S380 is repeated depending on whether new data packets have been received or not.

However, if at S380, the EH 106 determines that an acknowledgement/confirmation message from the MH 110 has been received indicating that all of the data packets transmitted to the MH 110 by the EH 106 have been received, then at S382, the EH 106 transmits a second-type confirmation message which acknowledges either the last one of the two reserved and unacknowledged bytes of data (if one of the two reserved and unacknowledged bytes has already been acknowledged as part of a prior second-type confirmation message (e.g., at S368, or S378 for example)) or the last two reserved and unacknowledged bytes of data. By not acknowledging at least the last of the two reserved/unacknowledged bytes of data until a confirmation that all bytes of data have been successfully received by the MH 110, the EH 106 enables preserving the end-to-end semantic and ensuring a reliable transmission of all data bytes between the FH 102 and the MH 110.

Thereafter, at S384, depending on a TCP message (i.e. a TCP FIN message) received at the EH 106 either from the FH 102 or from the MH 110, the EH 106 determines whether to maintain the TCP sessions to facilitate the exchange of more data packets between the FH 102 and the MH 110 or to terminate the TCP sessions. If at S384, the EH 106 determines to maintain the TCP sessions, the process reverts back to S372 where either S352 to S380 is repeated or S372-S380 is repeated depending on whether new data packets have been received or not.

However, if the EH 106 determines to terminate the TCP termination, then at S386, the EH 106 terminates the first and second TCP sessions established at S350, according to known methods for terminating TCP connections.

In one example embodiment, the EH 106 terminates the first TCP session with the FH 102 by receiving a FIN message from the FH 102, acknowledging the receipt of the FIN message to the FH 102 and then receive a further acknowledgement from the FH 102 confirming that the receipt acknowledge of the FIN message sent by the EH 106 is received.

In one example embodiment, the EH 106 terminates the second TCP session with the MH 110 by transmitting a FIN message to the MH 110, receiving an acknowledgment from the MH 110 acknowledging the receipt of the FIN and then transmitting a further acknowledgement to the MH 110 confirming that the receipt acknowledge of the FIN message sent by the MH 110 is received by the EH 106.

Hereinafter, several example embodiments will be described for handling the transmission of data packets between the FH 102, the EH 106 and the MH 110 according to the ES-TCP mechanism of FIG. 3.

Figure 4:
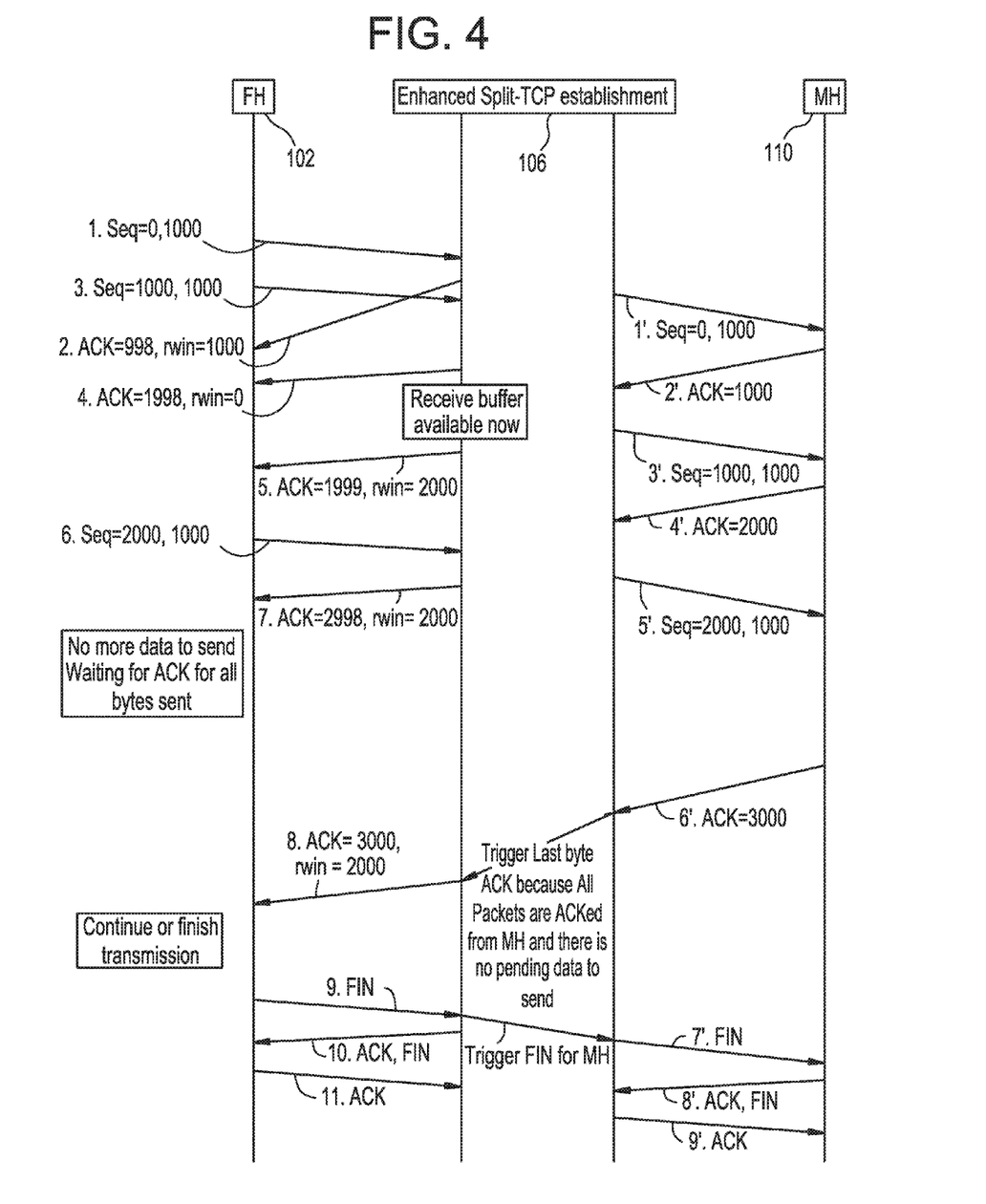
FIG. 4 illustrates data packet exchanges between the FH, the EH and the MH of FIG. 1 based on the ES-TCP mechanism of FIG. 3, according to one example embodiment.

FIG. 4 illustrates data packet exchanges between the FH, the EH and the MH of FIG. 1 based on the ES-TCP mechanism of FIG. 3, according to one example embodiment.

The example embodiment of FIG. 4 assumes that the FH 102 has 3000 bytes of data to transmit to the MH 110, that each data packet has a length of 1000 bytes and that the buffer 220 at the EH 106 has a size of 2000 bytes.

As shown in FIG. 4, there are two parallel and independent sets of flows. One set of flows are designated as flow numbers 1 to 11 between the FH 102 and the EH 106 and another set of flows are designated as flow numbers 1' to 9' between the EH 106 and the MH 110. In one example embodiment, the two sets of flows occur in parallel and independent of one another except for flow numbers 8 and 6', which will be described below.

The first set of flows between the FH 102 and the EH 106 is described next with reference to FIG. 4.

Upon establishing the TCP connections as described above with reference to S350, at flow number 1, the FH 102 transmits a first data packet starting with a sequence number 0 and including 1000 bytes of data. At flow number 2, the EH 106 sends a first-type confirmation message to the FH 102 with a sequence number equal to 998. In one example embodiment, the sequence number 998 indicates/confirms the receipt of the first 998 bytes of the first data packet but not the last two bytes (i.e., the reserved and unacknowledged bytes 999 and 1000) of the first data packet. As part of flow number 2, the EH 106 also transmits a RWIN having a value of 1000 indicating that due to the receipt of the 1000 bytes of the first data packet, the buffer 220 now only has enough space to receive up to 1000 more bytes of data.

At flow number 3 and before receiving the first-type confirmation message at flow number 2, the FH 102 sends and the EH 106 receives a second data packet starting with the sequence number 1000 and including an additional 1000 bytes of data. Upon receiving the second data packet, the buffer 220 will be completely full (e.g., 2000 bytes of data from the first and second data packets). Accordingly, as part of flow number 4, the EH 106 transmits a first-type confirmation message to the FH 102 with a sequence number 1998, which indicates/confirms the receipt of the first 1998 bytes (including the previously reserved/unacknowledged bytes 999 and 1000) except the last two bytes of the second data packet (e.g., the newly/updated reserved and unacknowledged bytes 1999 and 2000 of the second data packet). Furthermore, because the buffer 220 is now full, in one example embodiment, the EH 106 transmits a RWIN having a value of 0 as part of the first-type confirmation message in order to freeze any further transmission of data packets by the FH 102 (this corresponds to S364 of FIG. 3).

After implementing S366 of FIG. 3 (e.g., determining that the buffer 220 is once again available to accept more data from the FH 102), the EH 106 transmits, as flow number 5, a second-type confirmation message to the FH 102. The second-type confirmation message includes a sequence number 1999 and a new RWIN (e.g., 2000 bytes indicating that the buffer 220 is completely empty). The sequence number 1999 indicates that in addition to the previously acknowledged 1998 bytes (as part of the flow number 4), one of the reserved/unacknowledged bytes (e.g., data byte 1999) is now acknowledged. By acknowledging one of the reserved/unacknowledged bytes (e.g., data byte 1999), the EH 106 unfreezes the FH 102 and thus allows the FH 102 to send more data packets to the EH 106.

At flow number 6, the FH 102 sends a third data packet (e.g., the last data packet given the assumption that the FH 102 has 3000 bytes of data to transmit to the MH 110). The flow number 6 has a sequence 2000 and includes the last 1000 bytes of the 3000 bytes of data.

Similar to flow number 2, the EH 106 sends a first-type confirmation message back to the FH 102 with a sequence number 2998 and an RWIN of 1000. The sequence number 2998 indicates/confirms the receipt of the first 2998 bytes (including the previously reserved unacknowledged $1999^{th}$ and $2000^{th}$ bytes). Once again, the EH 106 reserves the last two bytes of the third data packet (e.g., the newly/updated reserved and unacknowledged data bytes 2999 and 3000).

With respect to the exchanges between the EH 106 and MH 110, as indicated above, the flow numbers 1'-9' between the EH 106 and the MH 110 occur in parallel with the flow numbers 1-11 between the EH 106 and the FH 102. Flow numbers 1' to 6' between the EH 106 and the MH 110 are as known in the art and basically enable the communication of the first through third data packets as well as the confirmation of the receipt of the first through third packets from the EH 106 to the MH 110.

Upon receiving the flow number 6', the EH 106 determines that all of the 3000 bytes of data that originated from the FH 102 have been successfully received at the MH 110. Accordingly, as part of the flow number 8, the EH 106 transmits a second-type confirmation message to the FH 102 with a sequence number 3000 and an RWIN having a value of 2000. The sequence number 3000 indicates/confirms that all the data bytes (including the two reserved unacknowledged $2999^{th}$ and $3000^{th}$ bytes of data) have been received at the EH 106. Accordingly, the end-to-end semantic that ensure a reliable transmission of all data bytes between the FH 102 and the MH 110, is preserved.

The flow numbers 9-11 between the FH 102 and the EH 106 and the flow numbers 7'-9' between the EH 106 and the MH 110 are for purposes of terminating the TCP connections there between, as described above with reference to S386 of FIG. 3.

Figure 5:
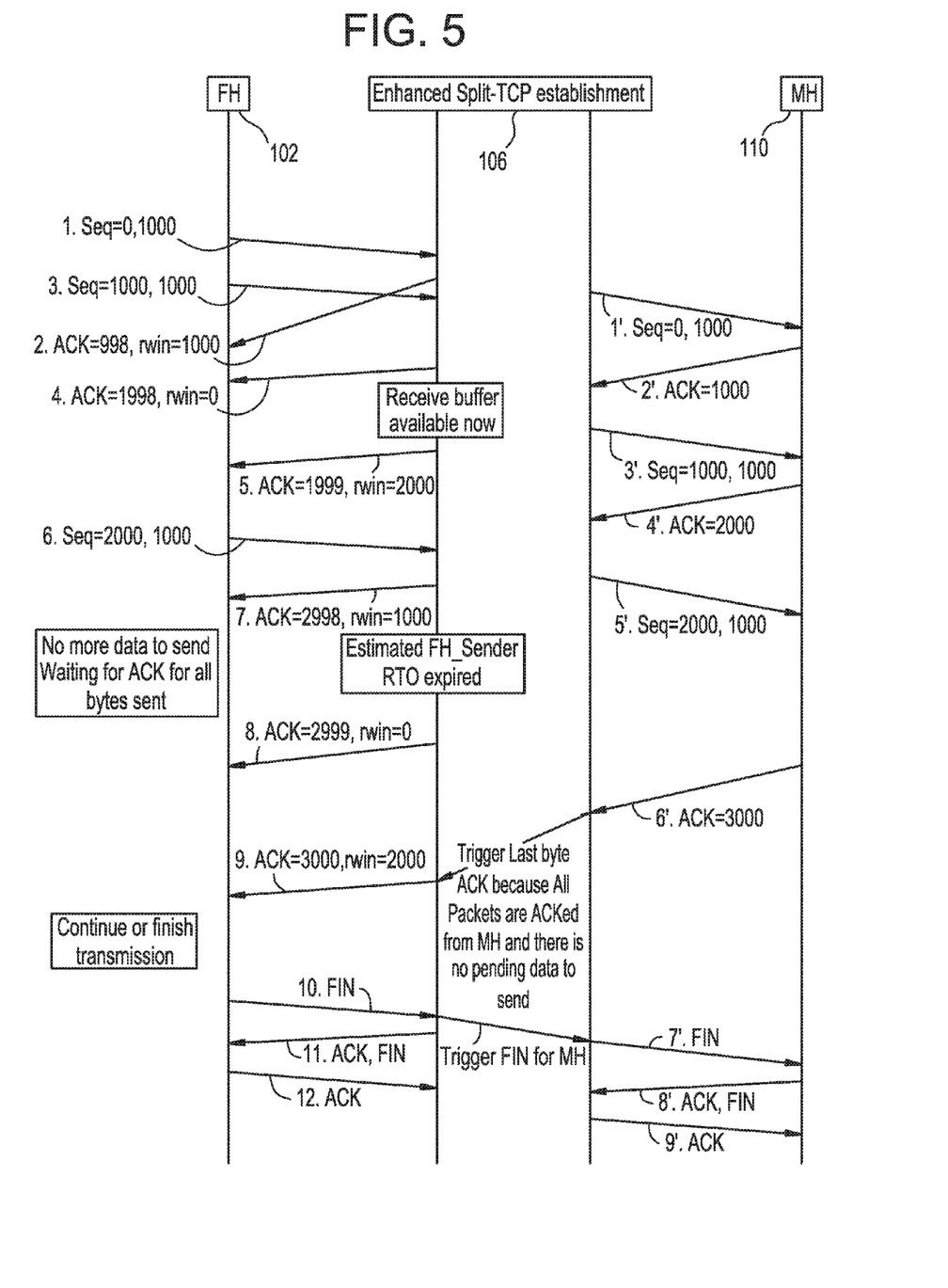
FIG. 5 illustrates data packet exchanges between the FH, the EH and the MH of FIG. 1 based on the ES-TCP mechanism of FIG. 3, according to one example embodiment.

FIG. 5 illustrates data packet exchanges between the FH, the EH and the MH of FIG. 1 based on the ES-TCP mechanism of FIG. 3, according to one example embodiment.

Similar to the example embodiment of FIG. 4, the example embodiment of FIG. 5 assumes that the FH 102 has 3000 bytes of data to transmit to the MH 110, that each data packet has a length of 1000 bytes and that the buffer 220 at the EH 106 has a size of 2000 bytes.

As shown in FIG. 5, there are two parallel and independent sets of flows. One set of flows are flow numbers 1 to 12 between the FH 102 and the EH 106 and another set of flows are flow numbers 1' to 9' between the EH 106 and the MH 110. In one example embodiment, the two sets of flows occur in parallel and independent of one another except for flow numbers 9 and 6', which will be described below.

Flow numbers 1-7 between the EH 106 and the FH 102 are exactly the same as the flow numbers 1-7 described above with reference to FIG. 4. Therefore, the description thereof is omitted for sake of brevity.

In the example embodiment of FIG. 5, the estimated RTO timer (described above with reference to S350 and S374 of FIG. 3) expires after the flow number 7. In other words, the estimated RTO timer at the receiver side of the EH 106 expires before the RTO timer at the FH 102 expires. As indicated above, the expiration of the RTO timer at the FH 102 triggers a retransmission of the reserved and unacknowledged bytes of data by the FH 102.

In one example embodiment and as described with reference to S378 of FIG. 3, when the estimated RTO timer at the EH 106 expires, the EH 106 transmits a second-type confirmation message (flow number 8) to the FH 102. The flow number 8 has a sequence number 2999. The sequence 2999 indicates/confirms that in addition to previously confirmed/acknowledged bytes of data, the EH 106 also confirms/acknowledges one of the reserved and unacknowledged bytes of data (e.g., byte 2999). The flow number 8 also has a RWIN with a value of 0. In one example embodiment and as described above with reference to FIG. 3 at S378, the RWIN of zero freezes the FH 102 and prevents the FH 102 from retransmitting any of the reserved and unacknowledged bytes of data that are yet to be acknowledged by the EH 106.

Flow numbers 1'-6' between the EH 106 and the MH 110 are exactly the same as the flow numbers 1'-6' described above with reference to FIG. 4. Therefore, the description thereof is omitted for sake of brevity.

In FIG. 5, upon receiving the flow number 6', the EH 106 determines that all of the 3000 bytes of data that originated from the FH 102 have been successfully received at the MH 110. Accordingly, as part of the flow number 9, the EH 106 transmits a second-type confirmation message to the FH 102 with a sequence number 3000 and an RWIN having a value of 2000. The sequence number 3000 indicates/confirms that all the data bytes (including the last one of the two reserved unacknowledged bytes of data, which in the example embodiment of FIG. 5 is the $3000^{th}$ byte) have been received at the EH 106. Accordingly, the end-to-end semantic that ensure a reliable transmission of all data bytes between the FH 102 and the MH 110, is preserved.

The flow numbers 10-12 between the FH 102 and the EH 106 and the flow numbers 7'-9' between the EH 106 and the MH 110 are for purposes of terminating the TCP connections there between, as described above with reference to S386 of FIG. 3.

Figure 6:
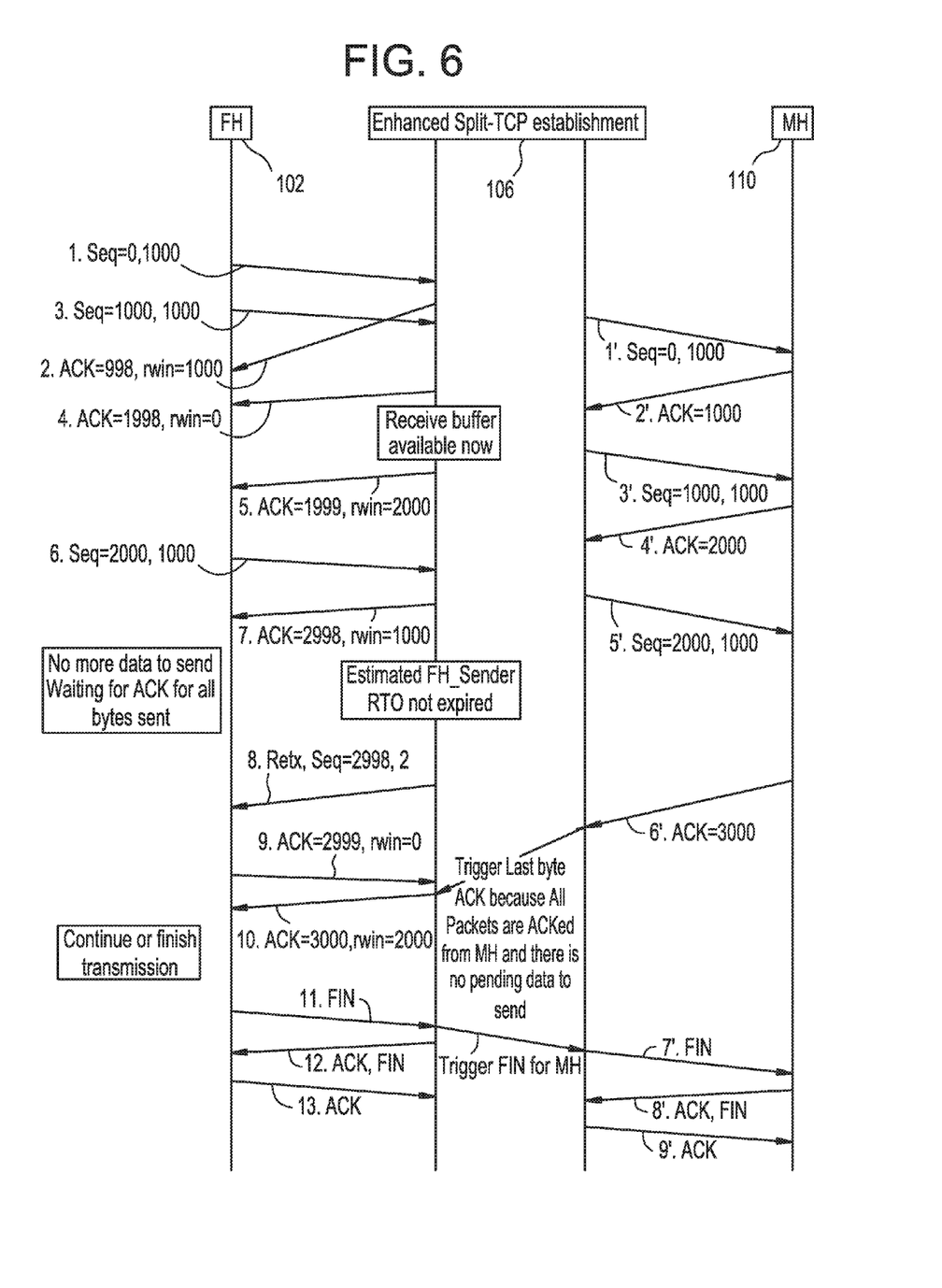
FIG. 6 illustrates data packet exchanges between the FH, the EH and the MH of FIG. 1 based on the ES-TCP mechanism of FIG. 3, according to one example embodiment.

FIG. 6 illustrates data packet exchanges between the FH, the EH and the MH of FIG. 1 based on the ES-TCP mechanism of FIG. 3, according to one example embodiment.

Similar to the example embodiment of FIG. 4, the example embodiment of FIG. 5 assumes that the FH 102 has 3000 bytes of data to transmit to the MH 110, that each data packet has a length of 1000 bytes and that the buffer 220 at the EH 106 has a size of 2000 bytes.

As shown in FIG. 5, there are two parallel and independent sets of flows. One set of flows are flow numbers 1 to 13 between the FH 102 and the EH 106 and another set of flows are flow numbers 1' to 9' between the EH 106 and the MH 110. In one example embodiment, the two sets of flows occur in parallel and independent of one another except for flow numbers 10 and 6', which will be described below.

Flow numbers 1-7 between the EH 106 and the FH 102 are exactly the same as the flow numbers 1-7 described above with reference to FIG. 4. Therefore, the description thereof is omitted for sake of brevity.

In the example embodiment of FIG. 6, after flow number 7, it is assumed that the estimated RTO timer (described above with reference to S350 and S374 of FIG. 3) has not yet expired but that the actual TRO timer at the FH 102 has expired. In one example embodiment and as described with reference to S376 and S378 of FIG. 3, the EH 106 receives a retransmission of the two reserved/unacknowledged bytes of data (e.g., bytes 2999 and 3000) from the FH 102 due to the expiration of the actual RTO at the FH 102.

Immediately after receiving the retransmission of the two reserved and unacknowledged bytes of data, as part of the flow number 9, the EH 106 transmits a second-type confirmation message to the FH 102. The flow number 9 has a sequence number 2999. The sequence 2999 indicates/confirms that in addition to previously confirmed/acknowledged bytes of data, the EH 106 also confirms/acknowledges one of the reserved and unacknowledged bytes of data (e.g., byte 2999). The flow number 9 also has a RWIN with a value of 0. In one example embodiment and as described above with reference to FIG. 3 at S378, the RWIN of zero freezes the FH 102 and prevents the FH 102 from any further retransmitting of the reserved and unacknowledged bytes of data that are yet to be acknowledged by the EH 106.

Flow numbers 1'-6' between the EH 106 and the MH 110 are exactly the same as the flow numbers 1'-6' described above with reference to FIG. 4. Therefore, the description thereof is omitted for sake of brevity.

In FIG. 6, upon receiving the flow number 6', the EH 106 determines that all of the 3000 bytes of data that originated from the FH 102 have been successfully received at the MH 110. Accordingly, as part of the flow number 10, the EH 106 transmits a second-type confirmation message to the FH 102 with a sequence number 3000 and an RWIN having a value of 2000. The sequence number 3000 indicates/confirms that all the data bytes (including the last one of the two reserved unacknowledged bytes of data, which in the example embodiment of FIG. 6 is the $3000^{th}$ byte) have been received at the EH 106. Accordingly, the end-to-end semantic that ensure a reliable transmission of all data bytes between the FH 102 and the MH 110, is preserved.

The flow numbers 11-13 between the FH 102 and the EH 106 and the flow numbers 7'-9' between the EH 106 and the MH 110, as shown in FIG. 7, are for purposes of terminating the TCP connections there between, as described above with reference to S386 of FIG. 3.

The foregoing description of example embodiments has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

We claim:

1. A network node, comprising:
  a processor configured to,
    receive one or more data packets from a transmitter,
    transmit at least one first-type confirmation message to the transmitter based on a threshold, the at least one first-type confirmation message including an acknowledgement that all but at least two bytes of data included in the one or more data packets are received from the transmitter, and
    transmit at least one second-type confirmation message to the transmitter based on at least one of a size of a buffer at the network node available for receiving data packets and an acknowledgement from an end device acknowledging receipt of the one or more data packets, the at least one second message including an acknowledgement of one or more of the at least two bytes of data.

2. The network node of claim 1, wherein the processor is configured to,
  transmit the at least one first-type confirmation message if a total size of a most recent one of the one or more data packets and the at least two unacknowledged bytes of data, is greater than the threshold, and
  upon transmitting the at least one first-type confirmation message, update the at least two unacknowledged bytes of data to be the last two bytes of the most recent one of the one or more data packets.

3. The network node of claim 1, wherein the processor is configured to determine a window size, the window size indicating the size of the buffer at the network node that is available for receiving the one or more data packets from the transmitter, the window size being transmitted as part of the at least one first-type confirmation message or the at least one second-type confirmation message to the transmitter.

4. The network node of claim 3, wherein, upon determining that the window size is zero, the processor is configured to transmit the window size of zero as part of the at least one first-type confirmation message to the transmitter, the transmission of the window size of zero freezing a transmission of further data packets by the transmitter to the network node.

5. The network node of claim 4, wherein upon determining that the window size has changed from zero to a non-zero value, the processor is configured to transmit the at least one second-type confirmation message to the transmitter, the at least one second-type confirmation message including the non-zero window size and an acknowledgement of one of the at least two unacknowledged bytes of data, the non-zero value window size and the acknowledgement of the one of the at least two unacknowledged bytes of data included in the at least one second-type confirmation message resulting in unfreezing of the transmission of further data packets by the transmitter.

6. The network node of claim 5, wherein the processor is configured to,
  transmit the received one or more data packets to the end device,
  receive the acknowledgement from the end device acknowledging the receipt of the one or more data packets by the end device, and
  upon receiving the acknowledgement from the end device, transmit the at least one second-type confirmation message to the transmitter indicating that the at least two unacknowledged bytes of data have been received.

7. The network node of claim 3, wherein upon determining that the window size is greater than zero, the processor is configured to,
  transmit the at least one first-type confirmation message to the transmitter,
  determine whether an estimated retransmission time out (RTO) timer has expired, the RTO timer being a timer at the transmitter, which when expired, cause the transmitter to retransmit the at least two unacknowledged bytes of data to the network node, and
  transmit the at least one second-type confirmation message to the transmitter if the processor determines that the estimated RTO timer has expired, the at least one second-type confirmation message including a window size of zero and an acknowledgement of one of the at least two unacknowledged bytes of data, the zero window size and the acknowledgement of the one of the at least two unacknowledged bytes of data included in the at least one second-type confirmation message resulting in a freezing of one or more retransmissions of the at least two unacknowledged bytes of data to the network node by the transmitter.

8. The network node of claim 7, wherein upon determining that the estimated RTO timer has not expired, the processor is configured to,
  determine whether a retransmission of at least one of the at least two unacknowledged bytes of data has been received at the network node from the transmitter;
  transmit the at least one second-type confirmation message upon determining that the network node has received the retransmission of at least one of the at least two unacknowledged bytes of data.

9. The network node of claim 8, wherein the processor is configured to,
  transmit the received one or more data packets to the end device, and
  transmit the at least one second-type confirmation message to the transmitter indicating that the at least two unacknowledged bytes of data have been received, if the processor receives the acknowledgement from the end device acknowledging the receipt of the one or more data packets by the end device.

10. The network node of claim 7, wherein the processor is configured to estimate the RTO timer to be less than an actual RTO timer at the transmitter.

11. The network node of claim 1, wherein
  a network in which the network node, the transmitter and the end device operate is one of a 4G-LTE network or a 5G network,
  the network node is a packet gateway,
  the transmitter is a content server,
  the end device is a mobile device operating within the network, and
  a communication between the transmitter, the network node and the end device is a transport control protocol (TCP) based communication.

12. A method comprising:
  receiving one or more data packets from a transmitter,
  first transmitting at least one first-type confirmation message to the transmitter based on a threshold, the at least one first-type confirmation message including an acknowledgement that all but at least two bytes of data included in the one or more data packets are received from the transmitter, and
  second transmitting at least one second-type confirmation message to the transmitter based on at least one of a size of a buffer at the network node available for receiving data packets and an acknowledgement from an end device acknowledging receipt of the one or more data packets, the at least one second message including an acknowledgement of one or more of the at least two bytes of data.

13. The method of claim 12, wherein
  the first transmitting transmits the at least one first-type confirmation message if a total size of a most recent one of the one or more data packets and the at least two unacknowledged bytes of data, is greater than the threshold, and
  upon transmitting the at least one first-type confirmation message, updating the at least two unacknowledged bytes of data to be the last two bytes of the most recent one of the one or more data packets.

14. The method of claim 12, further comprising:
  determining a window size, the window size indicating the size of the buffer at the network node that is available for receiving the one or more data packets from the transmitter, the window size being transmitted as part of the at least one first-type confirmation message or the at least one second-type confirmation message to the transmitter.

15. The method of claim 14, wherein upon determining that the window size is zero, the first transmitting transmits the window size of zero as part of the at least one first-type confirmation message to the transmitter, the transmission of the window size of zero freezing a transmission of further data packets by the transmitter to the network node.

16. The method of claim 15, wherein upon determining that the window size has changed from zero to a non-zero value, the second transmitting transmits the at least one second-type confirmation message to the transmitter, the at least one second-type confirmation message including the non-zero window size and an acknowledgement of one of the at least two unacknowledged bytes of data, the non-zero value window size and the acknowledgement of the one of the at least two unacknowledged bytes of data included in the at least one second-type confirmation message resulting in unfreezing of the transmission of further data packets by the transmitter.

17. The method of claim 16, further comprising:
third transmitting the received one or more data packets to the end device, and
receiving the acknowledgement from the end device acknowledging the receipt of the one or more data packets by the end device, wherein
upon receiving the acknowledgement from the end device, the second transmitting transmits the at least one second-type confirmation message to the transmitter indicating that the at least two unacknowledged bytes of data have been received.

18. The method of claim 14, wherein
the first transmitting transmits the at least one first-type confirmation message to the transmitter upon determining that the window size is greater than zero,
the method further comprises determining whether an estimated retransmission time out (RTO) timer has expired, the RTO timer being a timer at the transmitter, which when expired, cause the transmitter to retransmit the at least two unacknowledged bytes of data to the network node, and
the second transmitting transmits the at least one second-type confirmation message to the transmitter if the determining determines that the estimated RTO timer has expired, the at least one second-type confirmation message including a window size of zero and an acknowledgement of one of the at least two unacknowledged bytes of data, the zero window size and the acknowledgement of the one of the at least two unacknowledged bytes of data included in the at least one second-type confirmation message resulting in freezing of one or more retransmissions of the at least two unacknowledged bytes of data to the network node by the transmitter.

19. The method of claim 18, further comprising:
determining whether a retransmission of at least one of the at least two unacknowledged bytes of data has been received at the network node from the transmitter, upon determining that the estimated RTO timer has not expired, wherein
the second transmitting transmits the at least one second-type confirmation message upon determining that the network node has received the retransmission of at least one of the at least two unacknowledged bytes of data.

20. The method of claim 19, further comprising:
third transmitting the received one or more data packets to the end device, and
receiving the acknowledgement from the end device acknowledging the receipt of the one or more data packets by the end device, wherein
the second transmitting transmits the at least one second-type confirmation message to the transmitter indicating that the at least two unacknowledged bytes of data have been received, if the receiving receives the acknowledgement.

* * * * *